United States Patent
Chen et al.

(10) Patent No.: US 10,819,427 B2
(45) Date of Patent: Oct. 27, 2020

(54) MULTIUSER ACCESS FOR OPTICAL COMMUNICATIONS

(71) Applicant: The University Court of the University of Edinburgh, Edinburgh (GB)

(72) Inventors: Zhe Chen, Edinburgh (GB); Harald Haas, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 0 days.

(21) Appl. No.: 16/345,202

(22) PCT Filed: Oct. 6, 2017

(86) PCT No.: PCT/GB2017/053036
§ 371 (c)(1),
(2) Date: Apr. 25, 2019

(87) PCT Pub. No.: WO2018/078323
PCT Pub. Date: May 3, 2018

(65) Prior Publication Data
US 2019/0296825 A1    Sep. 26, 2019

(30) Foreign Application Priority Data

Oct. 26, 2016 (GB) .................................. 1618065.5

(51) Int. Cl.
*H04B 10/079* (2013.01)
*H04B 10/116* (2013.01)
(Continued)

(52) U.S. Cl.
CPC ..... *H04B 10/116* (2013.01); *H04B 10/07953* (2013.01); *H04B 10/114* (2013.01);
(Continued)

(58) Field of Classification Search
CPC ........... H04B 10/11–118; H04B 10/803; H04J 2011/0009; H04J 2011/0016;
(Continued)

(56) References Cited

U.S. PATENT DOCUMENTS

| | | | |
|---|---|---|---|
| 2011/0222420 A1* | 9/2011 | Li | H04L 1/0003 370/252 |
| 2013/0126713 A1* | 5/2013 | Haas | H04B 10/116 250/208.2 |

(Continued)

OTHER PUBLICATIONS

Sung et al: "Orthogonal frequency-division multiplexing access (OFDMA) based wireless visible light communication (VCL) system", Optics Communications, vol. 355, 2015, pp. 261-268. (Year: 2015).*

(Continued)

*Primary Examiner* — Li Liu
(74) *Attorney, Agent, or Firm* — Patent Law Works LLP

(57) ABSTRACT

A method and associated access point for processing data for transmission to communication devices, the method comprising determining or receiving channel state information, CSI, relating to a plurality of the communication devices; for each of one or more sub-carriers, determining which communication devices can communicate using the respective subcarrier according to, or based on, the channel state information or data derived therefrom; allocating communication devices to sub-carriers upon which each communication device can communicate; and providing data for at least one or more or each communication device on the sub-carriers to which the respective communication device has been allocated. Preferably, the method uses an adaptive bit loading algorithm to allocate communication devices to sub-carriers.

16 Claims, 6 Drawing Sheets

(51) Int. Cl.
*H04B 10/114* (2013.01)
*H04B 17/336* (2015.01)
*H04L 5/00* (2006.01)
*H04J 14/02* (2006.01)

(52) U.S. Cl.
CPC ........ *H04B 17/336* (2015.01); *H04J 14/0298* (2013.01); *H04L 5/001* (2013.01); *H04J 2211/00* (2013.01)

(58) Field of Classification Search
CPC ....... H04J 2013/0081; H04J 2013/0088; H04J 14/0298
USPC ........................... 398/96, 103, 118–131, 172
See application file for complete search history.

(56) References Cited

U.S. PATENT DOCUMENTS

2014/0050487 A1    2/2014  Liu et al.
2014/0226977 A1    8/2014  Jovicic et al.
2016/0204859 A1*   7/2016  Schenk .............. H05B 37/0245
                                                  398/118

OTHER PUBLICATIONS

Bykhovsky et al: "Multiple Access Resource Allocation in Visible Light Communication Systems", Journal of Lightwave Technology, vol. 32, Issue: 8, Apr. 15, 2014, pp. 1594-1600. (Year: 2014).*

Jiun-Yu Sung et al: Orthogonal frequency-division multiplexing access (OFDMA) based wireless visible light communication (VLC) system, Optics Communication, vol. 355, Nov. 1, 2015 (Nov. 1, 2015), pp. 261-268.

Bykhovsky Dima et al: "Multiple Access Resource Allocation in Visible Light Communication Systems", Journal of Lightwave Technology, IEEE Service Center, New York, NY, US, vol. 32, No. 8, Apr. 1, 2014 (Apr. 1, 2014), pp. 1594-1600.

International Search Report and Written Opinion for PCT/GB2017/053036, mailed from the International Searching authority on Dec. 6, 2017, 17 pgs.

* cited by examiner

MULTIUSER ACCESS FOR OPTICAL COMMUNICATIONS

FIELD OF INVENTION

The present invention relates generally to schemes for providing multiuser access in optical wireless communications, particularly in visible light communications (VLC).

BACKGROUND

The popularity of mobile communications, the growth of the "internet of things" and the generally increasing interconnection of many modern devices and applications has led to predictions of a "spectrum crunch", in which the radiofrequency spectrum available for traditional wireless communications methods is no longer sufficient to carry the required quantities of data (see e.g. "Lifi Leader Warns of RF Spectrum 'Crunch'" http://www.prnewswire.com/news-releases/lifi-leader-warns-of-rf-spectrum-crunch-570479211.html; "Wireless Data From Every lightbulb" https://www.ted.com/talks/harald_haas_wireless_data_from_every_light_bulb; and "Cisco Visual Networking Index: Global mobile data traffic forecast update, 2013-2018," Cisco, Feb. 5, 2014).

Visible light communication (VLC) has emerged as a leading candidate to address the spectrum crunch. Compared with RF communication, VLC operates at an unregulated part of the electromagnetic spectrum and is intrinsically safe to be used in electromagnetic interference (EMI) sensitive environments, such as aircraft, hospitals and oil refineries. The concept of an optical attocell network has been suggested (H. Haas, "High-speed Wireless Networking Using Visible Light," SPIE Newsroom, Apr. 19, 2013). In an optical attocell network, a lighting fixture can be regarded as an optical access point (AP). In order to serve multiple users simultaneously, a suitable multiple access scheme is necessary.

It is an object of at least one embodiment of at least one aspect of the present invention to provide a multiple access scheme for an optical communications system. It is an object of at least one embodiment of at least one aspect of the present invention to overcome or mitigate at least one problem with the prior art.

SUMMARY

According to an aspect is a method for processing data for transmission to communication devices. The method may comprise determining or receiving channel state information, CSI, relating to one or more, e.g. a plurality of, the communication devices, e.g. by performing a channel estimation. The method may comprise determining which communication devices can communicate using a given subcarrier according to, or based on, the channel state information or data derived therefrom. In other words, the method may comprise determining sub-carriers upon which each communication device can communicate, e.g. according to or based on the channel state information or data derived therefrom. The method may comprise allocating communication devices to frequency sub-carriers upon which each communication device can communicate. The method may comprise providing data for each communication device on the frequency sub-carriers to which the respective communication device has been allocated.

The channel state information may comprise or be used or usable to determine the variation of signal-to-noise ratio with frequency for at least one or each communication device. The determination of the frequency sub-carriers upon which each communication device can communicate according to the channel state information may comprise determining frequency sub-carriers for which a signal to noise ratio is above a threshold, which may be a pre-set or pre-defined threshold. The threshold may be zero.

The signal to noise ratio (e.g. an overall signal to noise ratio or trend in signal to noise ratio) may decrease with increasing frequency for each communication device. The method may anticipate this decrease in signal to noise ratio with frequency and may account for said fall-off in allocating devices to sub-carriers. The method may comprise determining a cut-off frequency for at least one or each communication device, wherein above the cut-off frequency the signal-to-noise ratio is below the threshold. The method may comprise only allocating communication devices to sub-carriers having frequencies or frequency ranges that are the equal to or less than the cut-off frequency for the respective communication device. The method may comprise preferentially allocating sub-carriers with lower or the lowest frequencies to communication devices having lower or the lowest cut-off frequency.

The method may comprise sending, e.g. periodically sending, one or more beacon signals to the communication devices. If any of the communication devices receiving the beacon signal require data transmission, the communication device may respond with an acknowledgement signal.

The method may comprise performing a channel estimation for at least one or each communication device (e.g. for at least one or each communication device requiring data transmission). The method may comprise determining channel state information for each communication device that sent an acknowledgement in response to the beacon signal sent, e.g. most recently sent, to the communication devices. The determination of channel state information may be performed as part of the channel estimation. The determination of channel state information may comprise sending one or more pilot signals to the respective communication devices. The pilot signal may comprise a pilot sequence. The pilot sequence may be or comprise or be comprised in a data frame, such as an orthogonal frequency-division multiplexing (OFDM) data frame. The method may comprise determining the signal to noise ratio for each subcarrier for at least one or each communication device (e.g. for at least one or each communication device requiring data transmission), which may be determined from the transmission of the pilot signal. The communication devices (e.g. at least one or each communication device requiring data transmission) may perform the channel estimation, e.g. by determining the channel state information, and the results may be communicated to the access point or unit. The method may comprise creating a data frame for the transmission of data based on the results of the channel estimation, e.g. the channel state information.

The method may comprise performing the channel estimation depending on the results of one of more calculations or measurements, e.g. by one or more sensors, which may be sensors of, or in communication with, at least one or each of the communication devices or a quality factor based thereon. For example, the calculations or measurements may comprise one or more of: motion, acceleration, temperature, light intensity and/or the like. Alternatively or additionally, the calculations or measurements may comprise one or more direct measurements of communication parameters such as bit error rate or packet loss (e.g. the results could be an increase in bit error rate or packet loss). The sensors may comprise one or more of: a motion sensor or accelerometer, a temperature sensor, a light intensity sensor and/or the like. For example, a virtual sensor may be provided that combines one or more of the above measurands to provide the quality factor, wherein channel estimation is performed dependant on the determined quality factor. The channel estimation may be triggered by the results of the one or more calculations or measurements meeting at least one criteria, such as a pre-set criteria. For example, the channel estimation may be triggered by a determination that a communication device has moved or otherwise become exposed to a change in its immediate environment.

The method may comprise allocating communication devices to sub-carriers using adaptive bit loading. The method may comprise determining the constellation size of the symbol (e.g. QAM symbol) on at least one or each subcarrier for at least one or each communication device (e.g. for at least one or each communication device requiring data transmission). The method (e.g. the step of determining which communication devices can communicate using the respective subcarrier) may comprise, for at least one or each subcarrier, determining if at least one or each communication device (e.g. at least one or each communication device requiring data transmission) is valid for accessing the respective subcarrier. A communication device may be a valid communication device for the respective subcarrier if the cut-off frequency for the communication device is equal to more than the frequency or frequency range of the subcarrier. A communication device may be a valid communication device for the respective subcarrier if the signal to noise ratio determined for the communication device at the frequency or frequency range of the subcarrier is above the threshold. A communication device may be a valid communication device for the respective subcarrier if the determined constellation size of the symbol on the respective subcarrier for that communication device is greater than zero. It will be appreciated that the number of valid communication devices for any given subcarrier may vary with time and/or may vary between sub-carriers. The step of allocating communication devices to frequency sub-carriers may comprise allocating to each of at least one or more sub-carriers only communications devices that are valid for the respective subcarrier.

The method (e.g. the step of allocating communication devices to frequency sub-carriers) may comprise scheduling communication devices for each carrier according to an algorithm, e.g. in a round-robin manner. The method (e.g. the step of allocating communication devices to frequency sub-carriers) may comprise allocating time slots for the respective subcarrier to valid communication devices according to the algorithm, e.g. in the round-robin manner. The method may optionally comprise biasing the allocation of valid communication devices for at least one or each respective subcarrier depending on the number of sub-carriers for which the communication device is valid. For example, more time slots for a given subcarrier may be allocated to certain valid communication devices for that subcarrier in preference to other valid communications devices for that subcarrier, based on a determination of which of the valid communications devices have fewer subcarriers available to them or that have a lower frequency cut-off The method may comprise variable power allocation between communication devices. The method may comprise uniform power allocation.

The method may comprise, for at least one or each subcarrier, grouping two or more valid communication devices for that subcarrier together, e.g. to form one or more groups of communication devices. The method may comprise, for at least one or each subcarrier, dividing and/or allocating the communication devices into the groups. The method may comprise allocating time slots for a given subcarrier to groups of valid communication devices, e.g. according to an algorithm, such as a round-robin allocation. The method may comprise allocating the same number of symbols or time slots to each group.

The method may be performed without performing successive interference cancellation.

The method may be performed by or using a transmitting device, which may be or comprise or be comprised in an access point or unit of a communications network, such as an optical communications access point or unit, which may be comprised in or part of an optical communications network. For example, the transmitting device, e.g. the access point or unit may be or comprise a visible light communications (VLC) access point or unit and/or the communications network may be, comprise, be comprised in or in communication with a visible light communications network. The transmitting device, e.g. the access point or unit, may be a wireless access point or unit, for example it may be configured to communicate by radiating electromagnetic radiation, e.g. light, through air and/or without being propagated through cables or physical waveguides.

The method may be or comprise or be comprised in an orthogonal frequency-division multiple access (OFDMA) method. The modulation bandwidth, e.g. in the frequency and time domains, may be divided into a plurality of sub-carriers, e.g. by operation of an inverse fast Fourier transform (IFFT). The providing of data on the frequency sub-carriers may comprise encoding or modulating the data in symbols and loading the symbols onto the allocated sub-carriers. The number of sub-carriers may be determined by the fast Fourier transform size. The method may preferably comprise use of DC-biased optical OFDM (DCO-OFDM) but may alternatively comprise use of asymmetrically clipped optical OFDM (ACO-OFDM) or other suitable optical OFDM method. The method may comprise loading different transmission energy and/or different size of symbol (e.g. QAM symbol) onto the sub-carriers, e.g. based on the channel state information.

According to a second aspect of the invention is a method of transmitting data to a plurality of communication devices, the method comprising processing data for transmission to communication devices using the method of the first aspect and transmitting data for at least one or more or each communication device on the frequency sub-carriers to which the respective communication device has been allocated based on the channel state information.

According to a third aspect is an access point or processing unit of a communication network, the access point or processing unit being configured to process or encode data for transmission to the mobile communication devices. The processing unit or access point may be configured to determine channel state information, CSI, relating to one or more, e.g. a plurality of, the mobile communication devices. The access point or processing unit may be configured to, for each of one or more sub-carriers, determine which communication devices can communicate using the respective subcarrier according to, or based on, the channel state information or data derived therefrom. The access point or processing unit may be configured to determine sub-carriers upon which each mobile communication device can communicate, e.g. according to or based on the channel state information or data derived therefrom. The access point or processing unit may be configured to allocate mobile communication devices to sub-carriers upon which each mobile communication device can communicate. The access point or processing unit may be configured to provide data for each mobile communication device on the sub-carriers to which they've been allocated.

The access point or processing unit may be, comprise or be comprised in an optical communications access point or processing unit, which may be comprised in or part of an optical communications network. For example, the access point or processing unit may be or comprise a visible light communications (VLC) access point or processing unit and/or the communications network may be, comprise, be comprised in or in communication with a visible light communications network. The access point may be a wireless access point or unit, for example, it may be configured to communicate by radiating electromagnetic radiation, e.g. light, through air and/or without being propagated through cables or physical waveguides.

The access point or processing unit may be configured to perform or implement the method of the first aspect and/or the method of the second aspect.

The access point or processing unit may comprise a processing system for performing at least some or all of the method of the first aspect. The access point or unit may comprise at least one transmitter, such as an optical transmitter, e.g. a light transmitter, which may comprise one or more LEDs. The transmitter may be operable responsive to the processing system, e.g. to transmit a signal, such as an optical communications signal, which may encode data for transmission to at least one or more or each of the mobile communication devices.

According to a fourth aspect is a communications system comprising an access point or unit according to the third aspect and a plurality of mobile communication devices, the access point or unit being configured to encode and transmit data to the plurality of mobile communication devices using the method of the first aspect and/or the method of the second aspect.

Each of the communication devices may comprise a receiver, such as an optical receiver, for receiving a communications signal, e.g. an optical communications signal, from the access point.

According to a fifth aspect is a computer program product configured such that, when implemented on an access point or processing unit or a processing system, causes the access point or processing unit or processing device to perform the method of the first aspect or the method of the second aspect. The computer program product may be provided or comprised on a non-tangible computer readable medium.

It should be understood that the individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

Various aspects of the invention will now be described by way of example only and with reference to the following drawings.

DETAILED DESCRIPTION OF THE DRAWINGS

Figure 1:
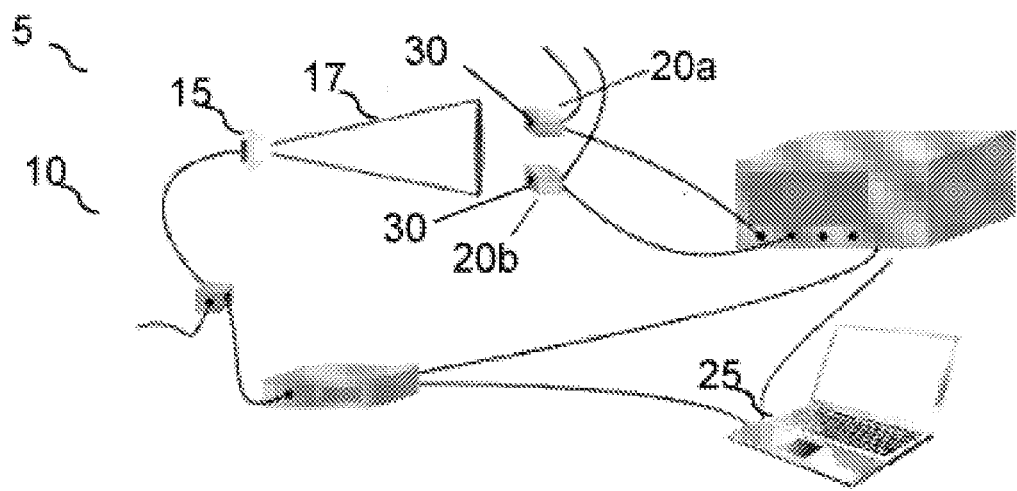
FIG. 1 an exemplary multi-user visible light communication apparatus.

FIG. 1 shows an example of a multi-user visible light communication (VLC) system 5 comprising an access point 10 having at least one visible light transmitter 15 for transmitting data encoded in visible light communication signals 17, and a plurality (in this particular example two) mobile communication devices 20*a*, 20*b* that receive the signals 17 and the data transmitted thereby.

Each mobile communication device 20*a*, 20*b* comprises an optical sensor (not shown) for receiving the signals 17 and converting the visible light communications signals 17 into electrical signals that can be processed by a receiver processor (not shown) to recover the data encoded therein.

The transmitter 15 is connected to, and operable responsive to, a controller 25 that comprises a processing system and is configured to encode data for transmission to the communication devices 20*a*, 20*b*, apply a DC bias to the transmitter 15 and control the transmitter 15 to modulate the light emitted by the transmitter 15 to thereby produce the signals 17 that encode and transmit the data to the communication devices 20*a*, 20*b*. The transmitter 15 can comprise one or more LEDs by way of preferable example, but other suitable transmitters would be apparent to one skilled in the art. In any event, visible light communication systems are generally known in the art (see e.g. H. Elgala, R. Mesleh and H. Haas "Indoor Optical Wireless Communication: Potential and State-of-the Art, IEEE Commun. Mag., vol. 49, no. 9, pp. 56-62 (2011) or H. Haas, "High Speed Wireless Networking using Visible Light", SPIE Newsroom, Apr. 19 (2013), amongst other examples).

Figure 2:
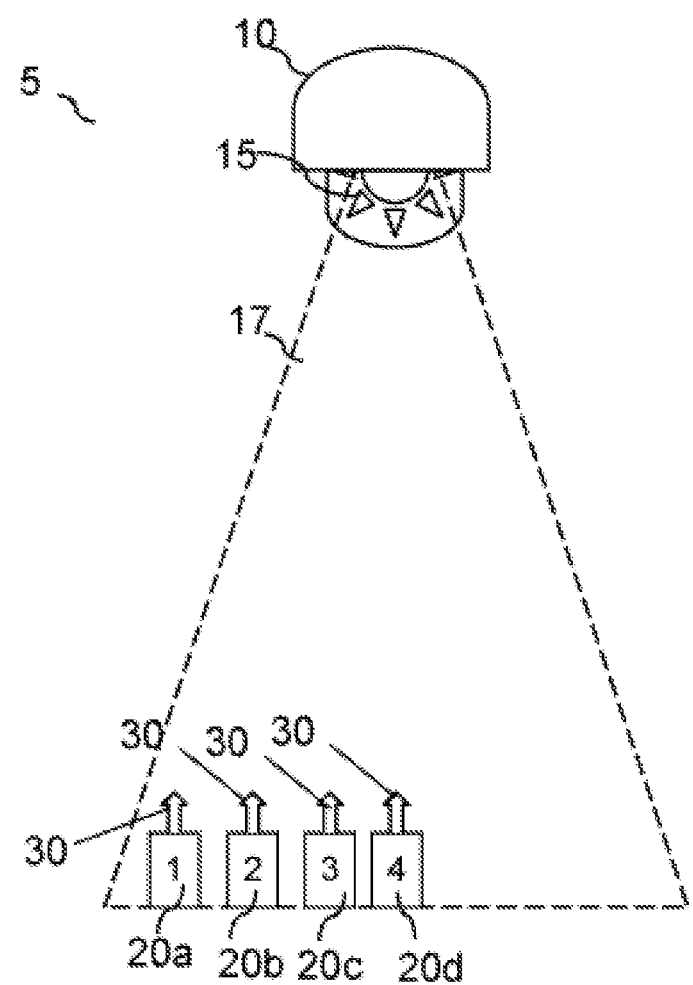
FIG. 2 an alternative exemplary multi-user visible light communication apparatus.

Another example of an optical wireless communication system 5' is shown in FIG. 2. In this system, an access point 10' comprises an optical transmitter 15' that is operable to transmit an optical wireless communication signal 17' to a plurality of (in this example four) mobile communication devices 20a, 20b, 20c, 20d that are configured with suitable receivers 30 for receiving the optical wireless communication signal 17' and converting it in to a corresponding electrical signal that can be processed to recover the transmitted data.

Again, it will be appreciated that the systems 5, 5' shown in FIGS. 1 and 2 are provided for ease of understanding and the present invention is not limited to the examples shown in these Figures.

Figure 3:
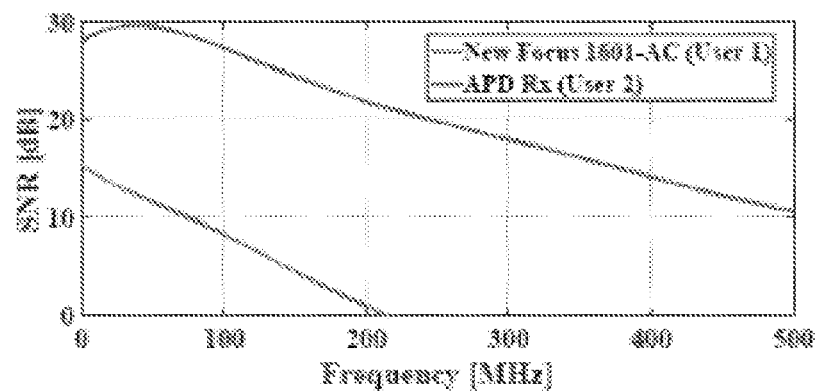
FIG. 3 shows the variation of signal to noise ratio for each of two communication devices shown in FIG. 1.

Each communication device 20a, 20b, 20c, 20d will have a signal to noise ratio profile that varies with frequency, for example as shown in FIG. 3, which shows the variation of signal to noise ratio with frequency for the two communication devices 20a, 20b shown in FIG. 1. The profile of the variation of signal to noise with frequency for each communication device 20a, 20b, 20c, 20d depends on factors such as the position and orientation of the communication device 20a, 20b, 20c, 20d relative to the access point (e.g. directly under the access point or offset to one side, pointed directly at the access point or angled away, and so on), the physical properties of the particular receiver 30 used by each communication device 20a, 20b, 20c, 20d, the amount of background light, the ambient temperature, and so on. It will be appreciated from this that it is likely that the profile of the variation of signal to noise with frequency will be different for each communication device 20a, 20b, 20c, 20d. Furthermore, the profile of the variation of signal to noise with frequency can vary in use, for example, as the communication devices 20a, 20b, 20c, 20d move or are re-orientated.

However, generally profiles of the signal to noise variation for the communication devices 20a, 20b, 20c, 20d in optical wireless communication systems fall as the frequency increases until they reach a point where the signal to noise ratio is effectively zero or at least below a predetermined threshold representing a minimum signal-to-noise ratio deemed necessary for satisfactory communication. As the signal to noise profile of the communication devices 20a, 20b, 20c, 20d varies in use, e.g. with changes in position or orientation of the communication devices 20a, 20b, 20c, 20d, then the frequency cut-off at which the signal-to-noise ratio falls below the threshold (or to effectively zero) can also vary.

In a typical optical wireless communication link, the direct current (DC) gain H(0) of the line-of-sight (LOS) path is calculated as follows:

$$H(0) = \frac{(m+1)A_{\mathit{eff}}}{2\pi d^2}\cos^m(\phi)\cos(\psi)rect\left(\frac{\psi}{\Psi_{\mathit{fov}}}\right)$$

where d is the distance between the optical transmitter 15 and its corresponding receiver 30; $\Psi_{\mathit{fov}}$ is the field-of-view (FOV) of the optical receiver 30; m is the Lambertian order of the optical transmitter 15 and is a function of the transmitter 15 half-intensity radiation angle $\Phi_{\mathit{tx}}$ as $$m = \frac{-1}{\log_2(\cos(\Phi_{\mathit{tx}}))};$$

φ is the angle of irradiance at the transmitter 15, ψ is the angle of incidence at the receiver 30, rect(.) is the rectangular function and $A_{\mathit{eff}}$ is the effective area of signal collection.

In VLC systems, channel gain is usually frequency selective and shows low-pass characteristics due to the effect of front-end device filtering. If a single carrier modulation scheme is used, system throughput is strictly limited by the 3 db bandwidth. This means most of the available modulation bandwidth is wasted. The present invention employs a multiple carrier modulation scheme, specifically OFDM. In particular, the example described herein uses optical OFDM in conjunction with adaptive bit loading to achieve high communication speeds. Preferably a spectrum efficient transmission scheme such as DC-biased optical OFDM (DCO-OFDM) is used rather than alternative methods such as asymmetrically clipped optical OFDM (ACO-OFDM).

As part of the OFDM approach, modulation bandwidth of the system 5 is divided into multiple sub-carriers 35 (see e.g. FIGS. 6 and 7) by operation of an inverse fast Fourier transform. The number of sub-carriers 35 is determined by fast Fourier transfer (FFT) size, $N_{\mathit{fft}}$.

Figure 4:
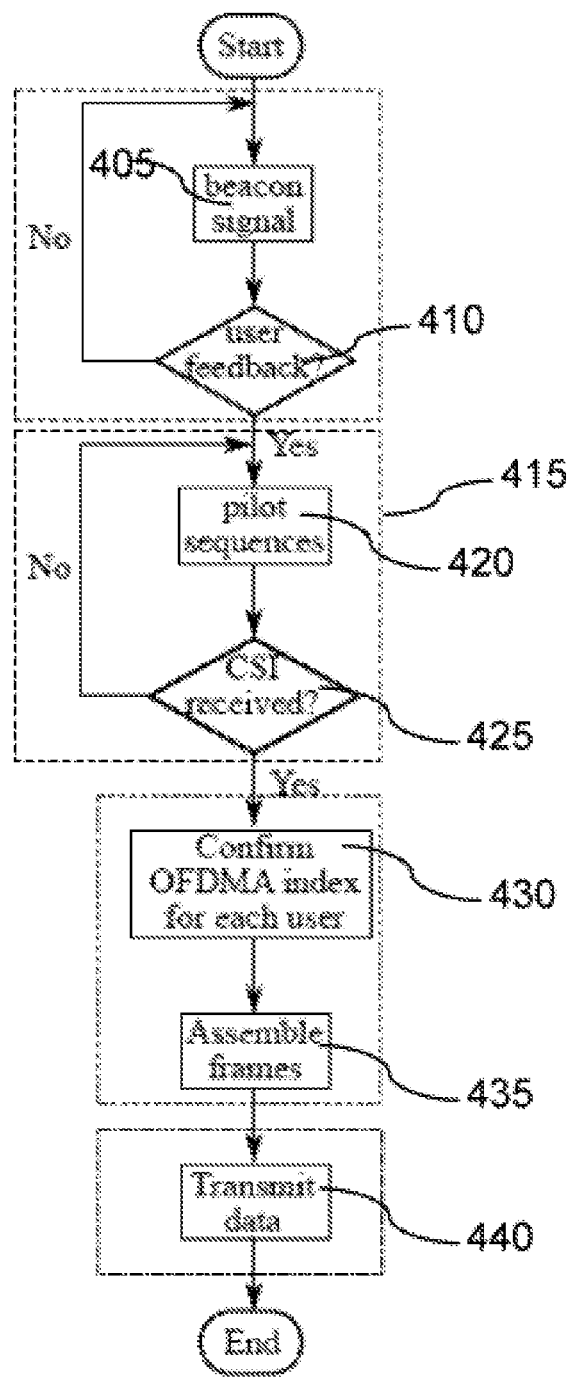
FIG. 4 a flowchart of an OFDMA multiple user access method for visible light communications.

A specific implementation of an OFDMA scheme for multi-user access in accordance with the above considerations is shown in FIG. 4. In step 405, a beacon signal is transmitted by the access point 10, 10'. The beacon signal can optionally be transmitted at specified periods, for example. If a communication device 20a, 20b, 20c, 20d receives the beacon signal from the access point 10, 10' and the communication device 20a, 20b, 20c, 20d requires communication, then it sends an acknowledgement signal to the access point 10, 10' (see step 410). If no acknowledgements are received by the access point 10, 10', then the access point 10, 10' simply takes no action and the process is repeated at the next beacon interval.

For those communication devices 20a, 20b, 20c, 20d that require communications and have therefore sent an acknowledgement to the access point 10, 10', the access point 10, 10' performs channel estimation (415) in order to determine channel state information for those communication devices 20a, 20b, 20c, 20d. This involves the access point 10, 10' sending a pilot sequence to each communication device 20a, 20b, 20c, 20d (step 420). For example, the pilot sequence can comprise an OFDM frame of test data to each communication device 20a, 20b, 20c, 20d that can be used to determine the signal to noise ratio on each subcarrier 35 for that communication device 20a, 20b, 20c, 20d. The channel estimation (e.g. the determination of signal to noise ratio profile using the pilot sequences) is performed by the respective communication devices 20a, 20b, 20c, 20d. For example, the frequency dependent channel gain can be represented as H(n), where n is the index of OFDM sub-carrier and n=0, 1, . . . , $N_{\mathit{fft}}$−1. The signal to noise ratio (SNR), γ(N), on n-th subcarrier is:

$$\gamma(N) = \frac{\tau^2\left(\frac{\sigma}{\sqrt{N_{\mathit{fft}}}}\right)^2 H^2(n)}{N_0 \frac{B}{N_{\mathit{fft}}}} = \frac{\tau^2 \sigma^2 H^2(n)}{N_0 B}$$

where τ is the responsivity of the photodiodes of the receiver 30, σ is the standard deviation of the time-domain light signal, No is additive white Gaussian noise (AWGN) power spectral density of the receiver 30 circuits and B is the modulation bandwidth.

The results of the channel estimation (e.g. the signal to noise to frequency profile) for each communication device 20a, 20b, 20c, 20d is then transmitted back to the access point 10, 10'.

Once the channel estimation results (i.e. the channel state information) for each communication device 20a, 20b, 20c, 20d that requires communications has been received by the access point 10, 10' (step 425), then the access point 10, 10' allocates data for different communication devices 20a, 20b, 20c, 20d (step 430) and creates the data frame based on the channel estimation results (435). The data (encoded onto suitable symbols) is then transmitted (step 440) in the data frame that was created based on the results of the channel estimation.

Different transmission energy and different size of symbols (e.g. quadrative amplitude modulation QAM) symbols can be loaded onto the sub-carriers using algorithms (see e.g. K. S. Al-Malwai et. Al. in "Simple Discrete Bit Loading for OFDM systems in Power Line Communications", in 2011 IEEE International Symposium on Power Line Communications and Its Applications (ISPLC), April 2011, pp. 267-270 or H. E. Levin, "A complete and optimal data allocation method for practical discrete multitoned systems", in Global Telecommunications Conference, 2001, GLOBECOM '01, IEEE, vol. 1, 2001, pp. 369-375, vol. 1 for examples of data loading algorithms), wherein the constellation size of the symbol on a subcarrier n of a $k^{th}$ communication device 20a, 20b, 20c, 20d is represented as $M_{n,\ k}$. In particular, the constellation size $M_{n,\ k}$ for each communication device 20a, 20b, 20c, 20d requiring communication is determined using an adaptive bit loading algorithm.

In particular, for each communication device 20a, 20b, 20c, 20d, the profile of signal to noise variation with frequency is determined for each communication device 20a, 20b, 20c, 20d requiring communication, e.g. as shown in FIG. 3 for the two communication devices 20a, 20b in example system 5 of FIG. 1 and as shown in FIGS. 5(a) to 5(d) respectively for the four communication devices 20a, 20b, 20c, 20d of the example system 5' of FIG. 2. For each profile for each communication device 20a, 20b, 20c, 20d, it can be seen that the signal to noise ratio falls with increasing frequency. A pre-determined threshold is applied (e.g. based on a target bit error ratio) that determines the lowest signal to noise ratio considered to be acceptable for satisfactory communications. A cut-off frequency can be determined for each communication device 20a, 20b, 20c, 20d above which the signal to noise ratio is below the threshold.

For each frequency subcarrier 35, the communication devices 20a, 20b, 20c, 20d that are valid for that subcarrier 35 are determined. A valid communication device 20a, 20b, 20c, 20d for a given subcarrier 35 has a cut-off frequency higher than the frequency range of the subcarrier 35, i.e. the signal to noise ratio determined for the communication device 20a, 20b, 20c, 20d for the frequency range associated with the subcarrier 35 is equal to or above the threshold. The constellation size of the symbol for the subcarrier in question for a valid communication device 20a, 20b, 20c, 20d is greater than zero. Any communication devices 20a, 20b, 20c, 20d that are valid for a given subcarrier 35 can access that subcarrier 35. It will be appreciated from the above that the numbers of communication devices 20a, 20b, 20c, 20d that can access a given subcarrier 35 can be different for different sub-carriers 35. It will also be appreciated that the number of communication devices 20a, 20b, 20c, 20d that can access a given subcarrier 35 can vary, e.g. as the communication device 20a, 20b, 20c, 20d moves or is re-oriented with respect to the transmitter 15, 15' of the access point 10, 10'.

The valid communication devices 20a, 20b, 20c, 20d for a given subcarrier 35 are allocated symbols/time slots for that subcarrier 35 according to a pre-determined allocation algorithm, such as round robin allocation. Although an example of a round robin allocation is given, it will be appreciated that any suitable allocation algorithm could be used, e.g. proportionally fair, weighted fair queueing, user prioritisation and/or the like. For example, the allocation algorithm could optionally comprise preferentially allocating, or allocating more, symbols/time slots to communication devices 20a, 20b, 20c, 20d that are valid for fewer sub-carriers 35 than to those communication devices 20a, 20b, 20c, 20d that are valid for more sub-carriers 35 to ensure more even available bandwidth for all devices that wish to communicate.

In this way, the frames of data for transmission can be assembled from the data for the communication devices 20a, 20b, 20c, 20d being encoded as symbols in the relevant sub-carriers. Once the frames are all assembled, then the data can be transmitted by the access point 10, 10' to the communication devices 20a, 20b, 20c, 20d.

Figure 6:
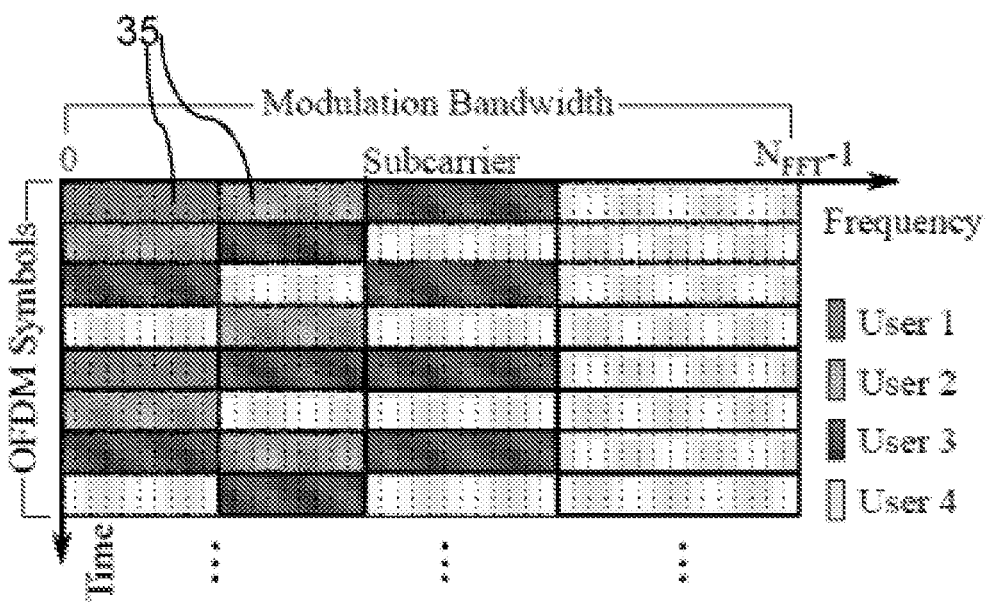
FIG. 6 a schematic showing sub-channel division in the OFDMA method of FIG. 4 when applied to the four mobile communication devices shown in FIG. 2.

The sub-carriers and time slots allocated by the above adaptive bit loading method for each of the four communication devices 20a, 20b, 20c, 20d shown in FIG. 2 are shown in FIG. 6. It can be seen from this that all of the modulation bandwidth is allocated to the communication devices 20a, 20b, 20c, 20d, which provides good system throughput.

Figure 5:
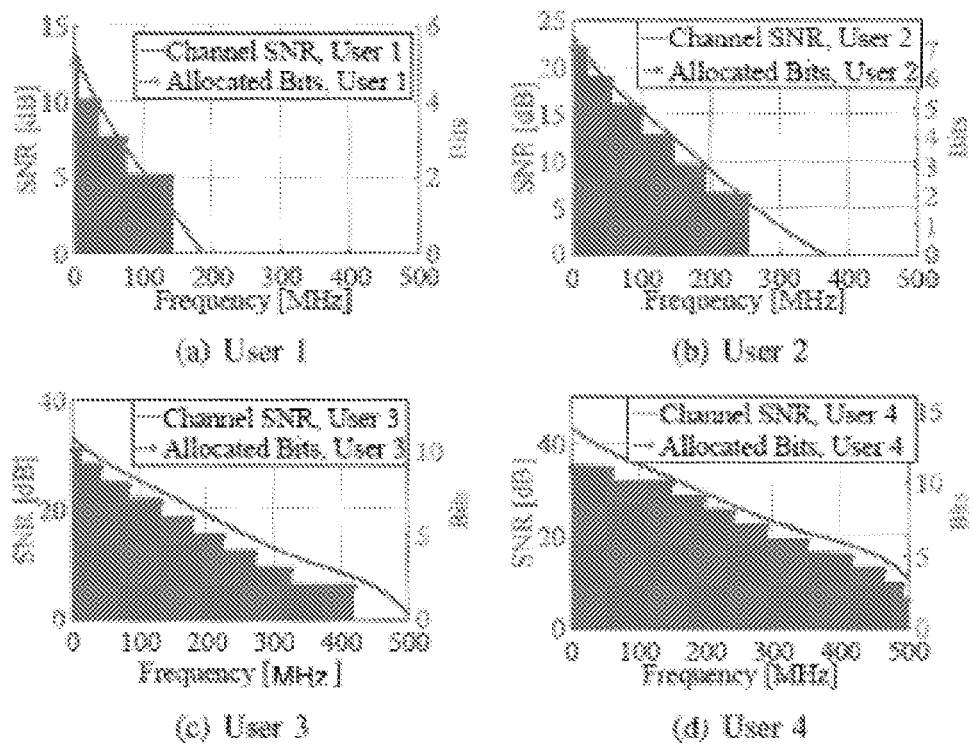
FIG. 5 measured signal-to-noise ratio and the result of adaptive bit loading for four visible light mobile communication devices shown in FIG. 2.
Figure 7:
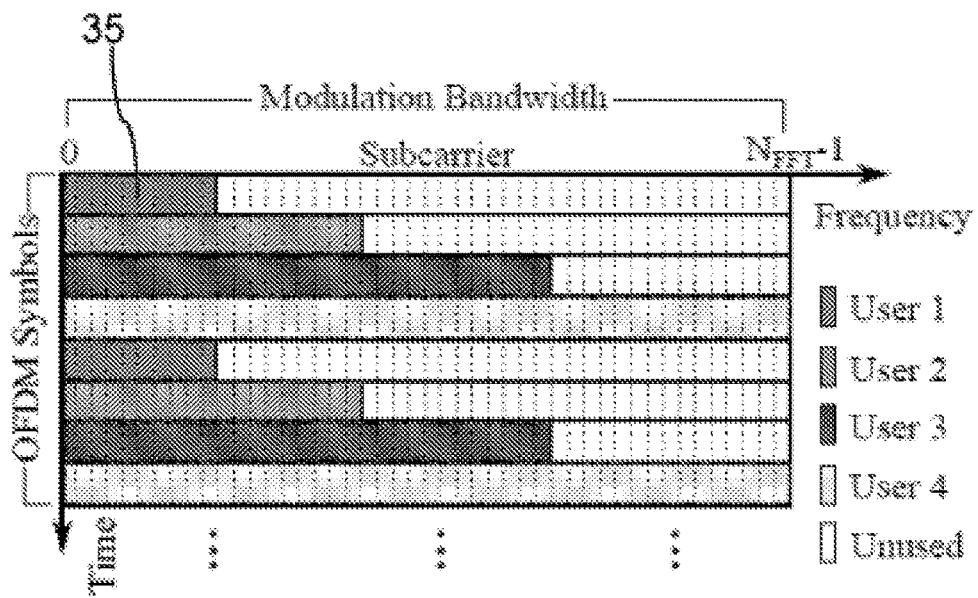
FIG. 7 a schematic showing sub-channel division for an alternative TDMA method when applied to the four mobile communication devices shown in FIG. 2.
Figure 8:
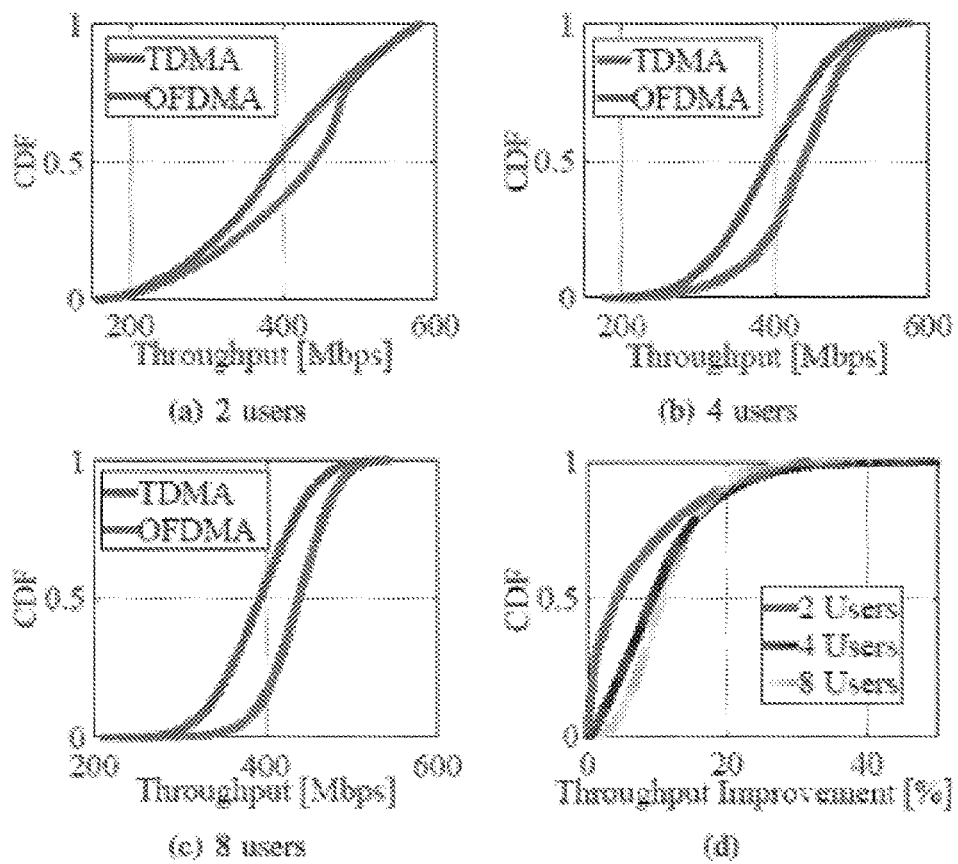
FIG. 8 (*a*) to (*c*) show the relative throughput of the OFDMA method of FIG. 4 relative to the TDMA method described with respect to FIG. 7 for two communication devices, four communication devices and eight communication devices respectively, (*d*) shows the percentage improvement in throughput between the OFDMA method of FIG. 4 relative to the TDMA method described with respect to FIG. 7 depending on the number of communication devices.

A corresponding time domain multiple access (TDMA) scheme is illustrated by way of a comparison with respect to FIG. 7. In TDMA methodology, all active communication devices 20a, 20b, 20c, 20d share the same bandwidth resource with information for different communication devices 20a, 20b, 20c, 20d being transmitted in different time slots. Within each time slot, OFDM is used to maximise data rate. The results of such a TDMA scheme is shown in FIG. 7, wherein it can be clearly seen that there is significant under-utilisation of modulation bandwidth due to the different profiles of signal to noise variation with frequency for each communication device 20a, 20b, 20c, 20d, as shown in FIG. 5.

Simulations were run to compare the relative performance of the specific implementation of OFDMA method described above with respect to FIGS. 3 to 6 with that of the TDMA method described above with respect to FIG. 7. In the simulation, active users are assumed to be uniformly distributed within a circular area of a radius of 3 m (see e.g. FIG. 2). An optical access point/access point 10, 10' is placed at the centre of the circular area on the ceiling. The height of the room, h, is 2.5 m. The transmitter 15 semi-angle is assumed to be 450. The modulation bandwidth, B, is assumed to be 250 MB. The FFT size, $N_{fft}$, is 1024. The target bit error rate (BER) for setting the threshold in the adaptive bit loading is $2 \times 10^{-3}$. The receivers 30 of every active communication device 20a, 20b, 20c, 20d are assumed to be identical.

The results of the simulation are shown in FIGS. 8(a) to 8(d), which clearly show that the throughput is superior for the above implementation of an OFDMA method than for the corresponding TDMA approach, with the relative improvement increasing with increasing numbers of communication devices 20a, 20b, 20c, 20d.

Figure 9:
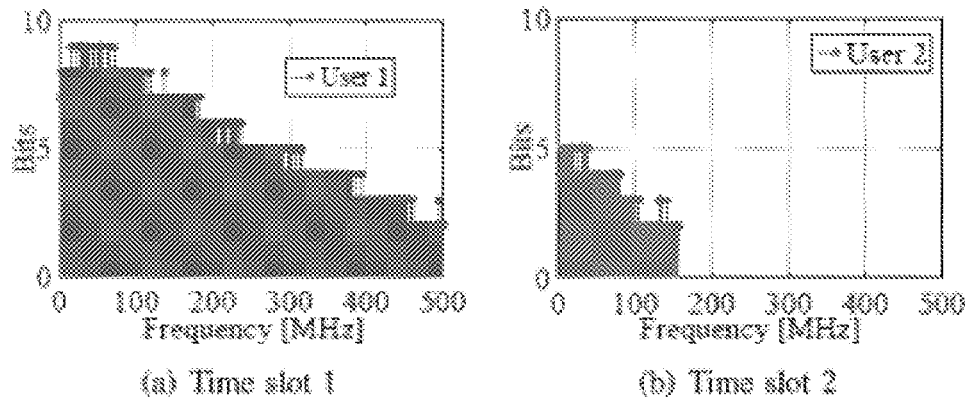
FIG. 9 shows subcarrier allocation using the TDMA method described with respect to FIG. 7 for each of the two communication devices shown in FIG. 1.
Figure 10:
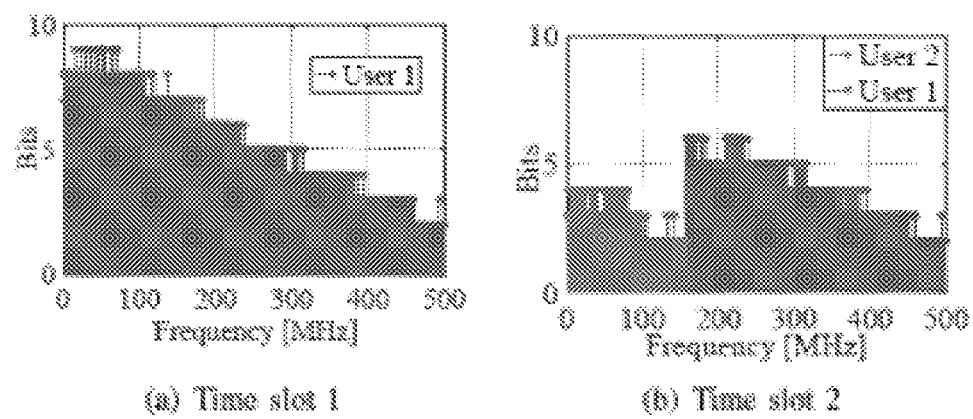
FIG. 10 shows subcarrier allocation using the OFDMA method of FIG. 4 for each of the two communication devices shown in FIG. 1.

The frequency sub-carriers used by each communication device 20a, 20b of the system 5 of FIG. 1 are respectively shown in FIGS. 9(a) and 9(b), in which it can be seen from FIG. 9(b) that the second communication device 20b only exploits a fraction of the total available bandwidth. In contrast, as can be seen from corresponding FIGS. 10(a) and 10(b) for the above implementation of an OFDM method, much higher utilisation of the available bandwidth is made.

The implementation of an OFDMA method described above can be modified to operate with more communication devices 20a, 20b, 20c, 20d than the maximum number of communication devices permitted per time slot. In particular, when the total number of active communication devices 20a, 20b, 20c, 20d $N_{total}$ is greater than M (the maximum number of communication devices per time slot), then the active communication devices 20a, 20b, 20c, 20d are divided, e.g. equally divided, into different groups and these groups can be scheduled according to an algorithm, such as by round robin rotation. The number of time slots allocated to each group can identical or otherwise allocated.

It will be appreciated that variations of the above approach can be used. For example, whilst periodic channel estimation based on beacon signals is described above, it will appreciated that channel estimation may be performed based on one or more measurements or determinations, for example a measurement or determination that one or more of the communication devices 20a, 20b, 20c, 20d have moved or re-oriented, for example responsive to an accelerometer or other motion sensor reading, or that one or more parameters than could affect the channel estimation occur, such as temperature changes, ambient light changes, and/or the like. Similarly, these parameters may be determined by measurement using a sensor, such as a temperature or light intensity sensor, e.g. a photovoltaic sensor or the like.

Furthermore, whilst it will be appreciated that at least some of the steps described above may be implemented by a computer program running on a suitable processing device or controller having a processor, memory, input/output devices and/or a communications system and/or the like, it will be appreciated that this need not necessarily be the case and that the method may instead by performed by suitable adapted or programmed hardware, such as an application specific integrated circuit (ASIC), field programmable gate array (FPGA), and/or the like. Furthermore all of the steps may be performed on a single processing device or controller or distributed over a plurality of processing devices or controllers.

As such, it will be appreciated that the above specific examples are provided to help understand the invention but that the scope of the invention is defined instead by the claims.

The invention claimed is:

1. A method for processing data for transmission using optical wireless communication to optical wireless communication devices, the method comprising:
   determining or receiving channel state information, CSI, relating to a plurality of the optical wireless communication devices;
   for each of one or more sub-carriers, determining which of the optical wireless communication devices can communicate using the respective subcarrier according to, or based on, the channel state information or data derived therefrom by determining frequency sub-carriers for which a signal-to-noise ratio from the channel state information or derived therefrom is above a threshold;
   determining a cut-off frequency for at least one or each optical wireless communication device, wherein above the cut-off frequency the signal-to-noise ratio is below the threshold;
   allocating optical wireless communication devices to sub-carriers upon which each optical wireless communication device can communicate, wherein the allocating comprises only allocating optical wireless communication devices to sub-carriers having frequencies or frequency ranges that are the equal to or less than the cut-off frequency for the respective optical wireless communication device; and
   providing data for at least one or more or each optical wireless communication device on the sub-carriers to which the respective optical wireless communication device has been allocated.

2. The method of claim 1, wherein the method comprises allocating optical wireless communication devices to sub-carriers using adaptive bit loading.

3. The method of claim 1, wherein the step of determining which optical wireless communication devices can communicate using the respective subcarrier comprises, for at least one or each subcarrier, determining if at least one or each optical wireless communication device requiring data transmission is valid for accessing the respective subcarrier, wherein an optical wireless communication device is a valid optical wireless communication device for the respective subcarrier if:
   the cut-off frequency for the optical wireless communication device is equal to more than the frequency or frequency range of the subcarrier; and/or
   if the signal to noise ratio determined for the optical wireless communication device at the frequency or frequency range of the subcarrier is above the threshold.

4. The method according to claim 3, wherein the number of valid optical wireless communication devices for any given subcarrier varies with time and/or between sub-carriers.

5. The method of claim 3, wherein the step of allocating optical wireless communication devices to frequency sub-carriers comprises allocating to each of the sub-carriers only optical wireless communications devices that are valid for the respective subcarrier.

6. The method according to any of claim 3 comprising, for at least one or each subcarrier, grouping two or more valid optical wireless communication devices for that subcarrier together to form one or more groups of optical wireless communication devices and allocating time slots for a given subcarrier to groups of valid optical wireless communication devices.

7. The method of claim 1, wherein the method is an optical OFDMA method for providing optical wireless communications for multiple optical wireless communications devices.

8. The method of claim 1 comprising performing a channel estimation for at least one or each optical wireless communication device requiring data transmission by sending one or more pilot signals to the respective optical wireless communication devices and determining the signal to noise ratio for each subcarrier for at least one or each optical wireless communication device requiring data transmission from the transmission of the pilot signal.

9. The method of claim 1, comprising performing the channel estimation depending on the results of one of more measurements or determinations or of a quality factor derived therefrom.

10. The method of claim 9, wherein the one or more measurements or determinations comprise one or more of: motion, acceleration, temperature, and/or light intensity and/or the one or more measurements or determinations may comprise one or more direct measurements of communication parameters.

11. The method of claim 9, wherein the channel estimation is triggered by a determination that an optical wireless communication device has moved and/or a temperature has changed and/or by an increase in bit error rate or packet loss.

12. A method of transmitting data to a plurality of optical wireless communication devices, the method comprising processing data for transmission to optical wireless communication devices using the method of any of claim 1 and transmitting data for at least one or more or each optical wireless communication device on the sub-carriers to which the respective optical wireless communication device has been allocated based on the channel state information.

13. An access point or processing unit of an optical wireless communication network, the access point or processing unit being configured to process or encode data for transmission using optical wireless communication to optical wireless communication devices by:
   determining channel state information, CSI, relating to one or more optical wireless communication devices;
   for each of one or more sub-carriers, determining which of the optical wireless communication devices can communicate using the respective subcarrier according to, or based on, the channel state information or data derived therefrom by determining frequency sub-carriers for which a signal-to-noise ratio from the channel state information or derived therefrom is above a threshold;
   determining a cut-off frequency for at least one or each optical wireless communication device, wherein above the cut-off frequency the signal-to-noise ratio is below the threshold;
   allocating optical wireless communication devices to sub-carriers upon which each optical wireless communication device can communicate, wherein the allocating comprises only allocating optical wireless communication devices to sub-carriers having frequencies or frequency ranges that are the equal to or less than the cut-off frequency for the respective optical wireless communication device; and
   providing data for each optical wireless communication device on the sub-carriers to which they've been allocated.

14. The access point or processing unit of claim 13, which is an access point or processing unit for a visible light communications network.

15. A communications system comprising an access point or unit according to claim 13 and a plurality of optical wireless communication devices, the access point or unit being configured to encode and transmit data to the plurality of optical wireless communication devices, the encoding and transmitting comprising:
   determining or receiving channel state information, CSI, relating to a plurality of the optical wireless communication devices;
   for each of one or more sub-carriers, determining which optical wireless communication devices can communicate using the respective subcarrier according to, or based on, the channel state information or data derived therefrom by determining frequency sub-carriers for which a signal-to-noise ratio from the channel state information or derived therefrom is above a threshold;
   determining a cut-off frequency for at least one or each optical wireless communication device, wherein above the cut-off frequency the signal-to-noise ratio is below the threshold;
   allocating optical wireless communication devices to sub-carriers upon which each optical wireless communication device can communicate, wherein the allocating comprises only allocating optical wireless communication devices to sub-carriers having frequencies or frequency ranges that are the equal to or less than the cut-off frequency for the respective optical wireless communication device; and
   providing data for at least one or more or each optical wireless communication device on the sub-carriers to which the respective optical wireless communication device has been allocated.

16. A non-transient computer readable storage medium comprising computer readable instructions that, when processed by at least one processor, cause the at least one processor to:
   determine or receive channel state information, CSI, relating to a plurality of optical wireless communication devices;
   for each of one or more sub-carriers, determine which optical wireless communication devices can communicate using the respective subcarrier according to, or based on, the channel state information or data derived therefrom by determining frequency sub-carriers for which a signal-to-noise ratio from the channel state information or derived therefrom is above a threshold;
   determining a cut-off frequency for at least one or each optical wireless communication device, wherein above the cut-off frequency the signal-to-noise ratio is below the threshold;
   allocate optical wireless communication devices to sub-carriers upon which each optical wireless communication device can communicate, wherein the allocating comprises only allocating optical wireless communication devices to sub-carriers having frequencies or frequency ranges that are the equal to or less than the cut-off frequency for the respective optical wireless communication device; and
   provide data for at least one or more or each optical wireless communication device on the sub-carriers to which the respective optical wireless communication device has been allocated.

* * * * *